United States Patent
Massey

[11] Patent Number: 5,826,406
[45] Date of Patent: Oct. 27, 1998

[54] SERVO-CONTROLLED CONVEYOR SYSTEM FOR CARRYING LIQUID FILLED CONTAINERS

[75] Inventor: Robert D. Massey, Paddock Lake, Wis.

[73] Assignee: Tetra Laval Holdings & Finance, S.A., Pully, Switzerland

[21] Appl. No.: 848,888

[22] Filed: May 1, 1997

[51] Int. Cl.⁶ .................. B65B 43/52; B65B 3/00
[52] U.S. Cl. .................. 53/467; 53/473; 53/64; 53/266.1; 53/282; 141/1; 141/129; 198/617; 198/792; 198/794
[58] Field of Search .................. 198/792, 794, 198/617; 141/1, 190, 191, 129, 138, 139; 53/467, 473, 282, 266.1, 64, 75

[56] References Cited

U.S. PATENT DOCUMENTS

| | | | |
|---|---|---|---|
| 4,751,806 | 6/1988 | Gram | 53/282 |
| 5,301,488 | 4/1994 | Ruhl et al. | 53/282 X |
| 5,385,003 | 1/1995 | Nixon, Jr. et al. | 53/282 X |
| 5,419,099 | 5/1995 | Mueller et al. | 53/473 |
| 5,437,361 | 8/1995 | Ohmori et al. | 53/282 X |
| 5,488,812 | 2/1996 | Stark et al. | 53/266.1 |

*Primary Examiner*—Horace M. Culver
*Attorney, Agent, or Firm*—Michael A. Catania

[57] ABSTRACT

A conveyor system for transporting a plurality of liquid-filled containers each having an open top is set forth. The conveyor system comprises a conveyor for supporting the plurality of liquid-filled containers. The conveyor is driven by a servomotor. A programmable servomotor control system is connected to control movement of the servomotor in indexed steps in accordance with a programmed motion profile. The programmed motion profile includes a move portion and a dwell portion, the move portion being substantially non-jerk limited. The non-jerk limited motion profile may take on many different characteristics. Preferably, the non-jerk limited profile is selected from the group consisting of a non-jerk limited constant acceleration profile having cosinuous acceleration transitions at beginning and end portions thereof, a non-jerk limited ramping acceleration profile, a non-jerk limited, pure cosine acceleration profile, and a non-jerk limited hybrid ramping acceleration profile with a subtractive cosine acceleration component. A method for selecting a motion profile for use in a packaging machine is also set forth herein.

30 Claims, 9 Drawing Sheets

SERVO-CONTROLLED CONVEYOR SYSTEM FOR CARRYING LIQUID FILLED CONTAINERS

BACKGROUND OF THE INVENTION

Packaging machines are known that integrate the various components necessary to fill and seal a container into a single machine unit. This packaging process, generally stated, includes feeding containers into the machine, filling the cartons with the desired contents, sealing the tops of the cartons, and then off loading the filled cartons for shipping. The motion and I/O control of the packaging machine may be undertaken by an electronic control system.

Trends within the field of packaging machines point toward increasingly high capacity machines intended for rapid, continuous filling and sealing of a very large number of identical or similar packaging containers, e.g., containers of the type intended for liquid contents such as milk, juice, and the like. One such machine is disclosed in U.S. Pat. No. 5,488,812 which is hereby incorporated by reference. The machine disclosed in the '812 Patent includes a plurality of processing stations, each station implementing one or more processes to form, fill, and seal the containers. Each of the processing stations is driven by one or more servomotors that drive the various components of each of the processing stations.

The increased throughput requirements have increased the demands that are placed on the packaging machines. The present inventor has recognized that one limitation on the throughput of a packaging machine lies in the control of the conveyor system used to transport containers between the various stations of the machine. The time required to transport the containers is often limited by the amount of sloshing experienced by the liquid filled containers that are being transported.

In traditional packaging machines, liquid-filled, open-top containers of rectangular cross-section are held vertically in a conveyor carriage and transported horizontally in straight trajectories by the conveyor via a move, dwell; move, dwell; . . . ; move, dwell sequence. The move/dwell sequence is common because operations on containers such as sterilization, filling, sealing, etc., as noted above, are often performed at processing stations that are disposed at fixed locations. Two sides of the container will be perpendicular to the direction of movement of the conveyor and two sides will be parallel to the direction of movement. The sequence of accelerations—or equivalently, the sequence of velocities or positions that are used for the move/dwell cycle of the container/conveyor are referred to as a motion profile. A single move/ dwell cycle is also often referred to as an index cycle. For decades, the motion profiles that move the conveyors (and thus the liquid-filled containers) have been controlled by cams that have executed "jerk-limited" acceleration profiles. A jerk-limited acceleration profile is one in which the acceleration of the motion profile is substantially continuous. That is, the acceleration profile never jumps substantially instantly from one acceleration to the next acceleration by a finite amount. This is in contrast to non-jerk limited profiles in which the acceleration profile jumps substantially instantly from one acceleration to the next acceleration by a finite amount. As such, when the acceleration profile of a jerk limited profile is differentiated with respect to time, a low finite jerk number results over the entire move. In contrast, when the acceleration profile of a non-jerk limited profile is differentiated with respective to time, a substantially large jerk number results at least at one portion of the motion profile.

Designers of cams, indexing "gearboxes", and other motion inducing mechanisms have for decades shaped their mechanisms to execute jerk-limited—i.e. continuous—acceleration profiles. They do so to prevent shock damage (jerk damage) to their mechanisms and to the objects moved. (See for example the discussion of jerk and acceleration in cam design in *Mark's Standard Handbook for Mechanical Engineer's —Ninth Edition*, Avalone and Baumeister, Editors, Pages 8-4, 5 and 6.) The jerk-limited acceleration profile has a first derivative with respect to time that is everywhere finite.

The most common jerk-limited acceleration profiles utilized to move conveyors of packaging machines are those derived from combinations of sinuous, constant, and consinuous acceleration curves. Special positioning, velocity, and or acceleration constraints sometimes force mechanical engineers to use polynomial position profiles—the most common being a 3rd order polynomial position profile that exhibits finite jerk. Higher order polynomial position profiles are generally not used.

The most common trigonometric acceleration profiles are the Modified Sine, the Modified Trapezoid, and the Pure Sinuous (cycloidal) motion profiles. The Modified Sine seems by far the most widely used motion profile. This is likely because: 1) it is the best general purpose profile in that its peak acceleration is lower than the cycloid and not much higher than the modified trapezoid and, as such, it requires and returns less power than the others; 2) it is easy to construct; and 3) many people and much of the industry literature traditionally recommend it. (See *Cam Design, A Manual for Engineers, Designers, and Draftsmen* by Clyde H. Moon, P. E., Published by Commercial Cam Division, Emerson Electric Company.)

Figure 1:
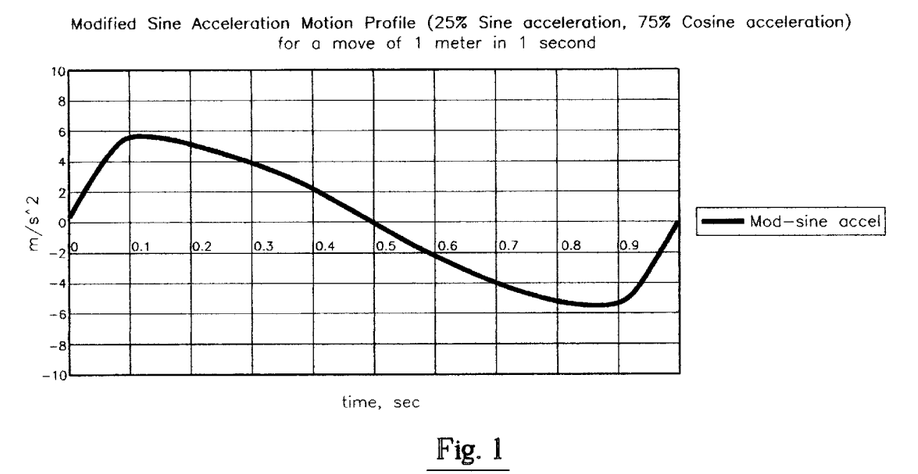
FIGS. 1–3 are graphs of the move portion of jerk limited motion profiles that are conventionally used to move a conveyor in a packaging machine to FIGS. 4–8 illustrate one embodiment of a liquid packaging machine and one embodiment of a corresponding control system that may implement the improved motion profiles.

FIG. 1 is an example of a Modified Sine acceleration profile that achieves a position displacement of 1 meter in a time of 1 sec. As illustrated, the first 12.5% of the move time is spent in sinuous acceleration, the next 75% is spent in cosinuous acceleration, and the final 12.5% of the move time is spent in sinuous acceleration.

Figure 2:
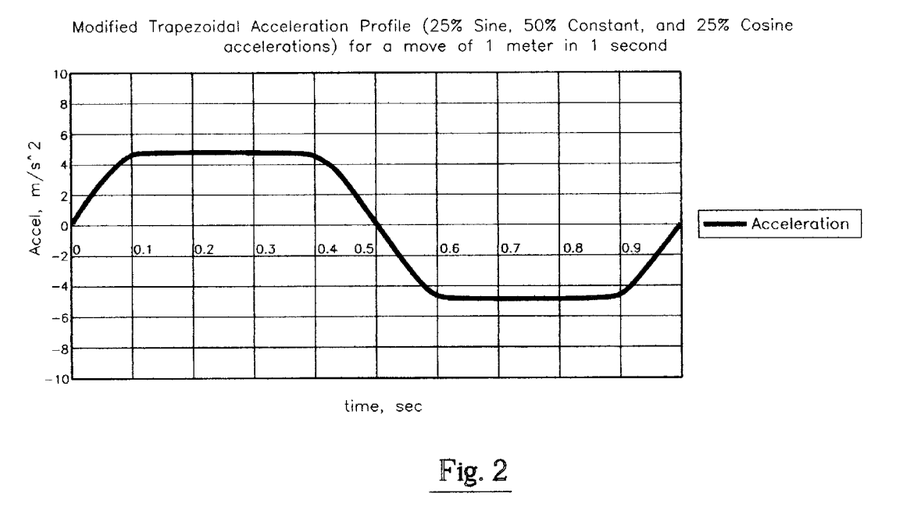
Figure 3:
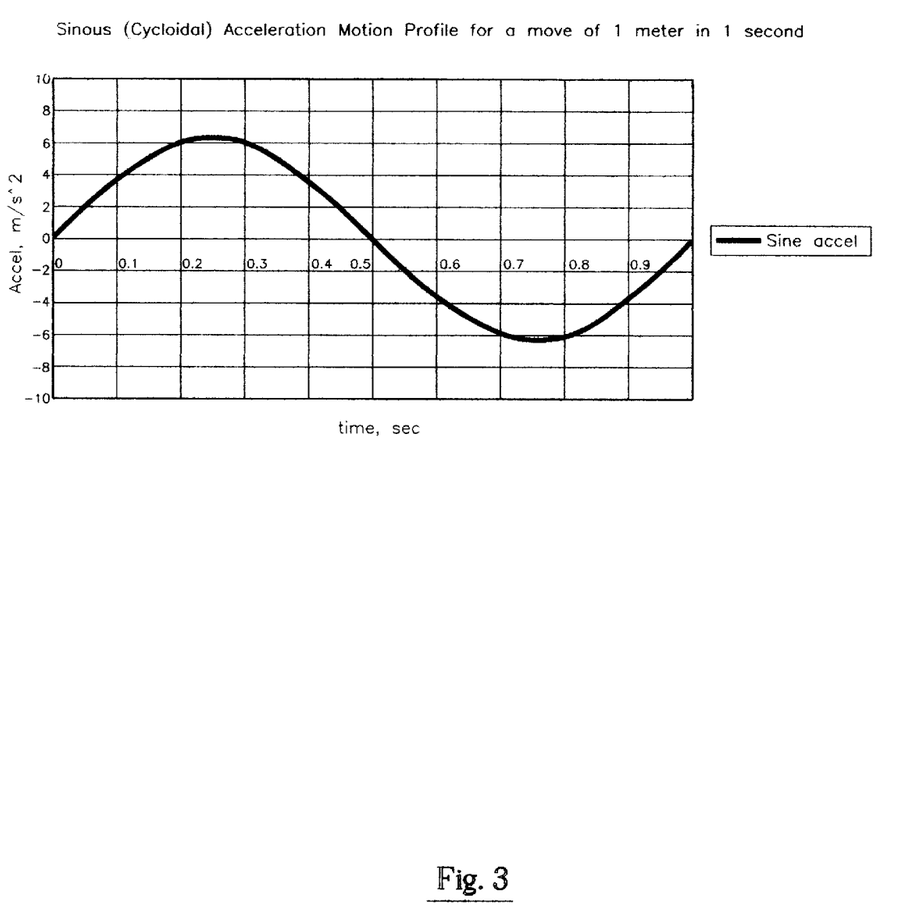

FIG. 2 is an example of a Modified Trapezoidal acceleration profile. As illustrated, first 12.5% of the move time is spent in sinuous acceleration, the next 25% in constant acceleration, the next 25% in cosinuous acceleration, the next 25% in constant acceleration, and the final 12.5% of the move time in sinuous acceleration. FIG. 3 is an example of a Pure Sinusoidal acceleration profile.

With the development of sufficiently powerful, programmable, and affordable motion control systems, it became possible to control the motions of "move, dwell" (indexing) conveyors by software programs instead of by mechanism shapes, such as cams. One example of a motion control system for a packaging machine is set forth in U.S. Pat. No. 5,706,627 titled "Control System For A Packaging Machine".

One of the most commonly used motion profiles in packaging machines having programmable motion control systems is the jerk-limited ramping acceleration profile. A jerk limited acceleration profile is illustrated in FIG. 3. It is equivalent to a 3rd order polynomial position profile because that is what the 2nd integral of the acceleration profile produces. Motion control system manufacturers call the velocity profile that is produced by such a ramping acceleration profile an "S-curve" velocity profile.

The present inventor has recognized that the foregoing jerk-limited motion profiles as applied to the drive of a conveyor system in a packaging machine that transports liquid-filled containers may be improved upon. Such improvements, as set forth herein, facilitate increased machine throughput while concurrently limiting liquid slosh.

BRIEF SUMMARY OF THE INVENTION

A conveyor system for transporting a plurality of liquid-filled containers each having an open top is set forth. The conveyor system comprises a conveyor for supporting the plurality of liquid-filled containers. The conveyor is driven by a servomotor. A programmable servomotor control system is connected to control movement of the servomotor in indexed steps in accordance with a programmed motion profile. The programmed motion profile includes a move portion and a dwell portion, the move portion being substantially non-jerk limited.

The non-jerk limited motion profile may take on many different characteristics. Preferably, the non-jerk limited profile is selected from the group consisting of a non-jerk limited constant acceleration profile having cosinuous acceleration transitions at beginning and end portions thereof, a non-jerk limited ramping acceleration profile, a non-jerk limited, pure cosine acceleration profile, and a non-jerk limited hybrid ramping acceleration profile with a subtractive cosine acceleration component.

A method for selecting a motion profile for use in a packaging machine is also set forth herein.

DETAILED DESCRIPTION OF THE INVENTION

The present invention may be used in any packaging machine system in which a container having an open top (partially or fully opened) is transported by a conveyor system in an indexed manner. As such, the present invention is applicable to liquid packaging machines for filling and sealing gable-top containers, flat-top containers, bottles, etc.

Figure 4A:
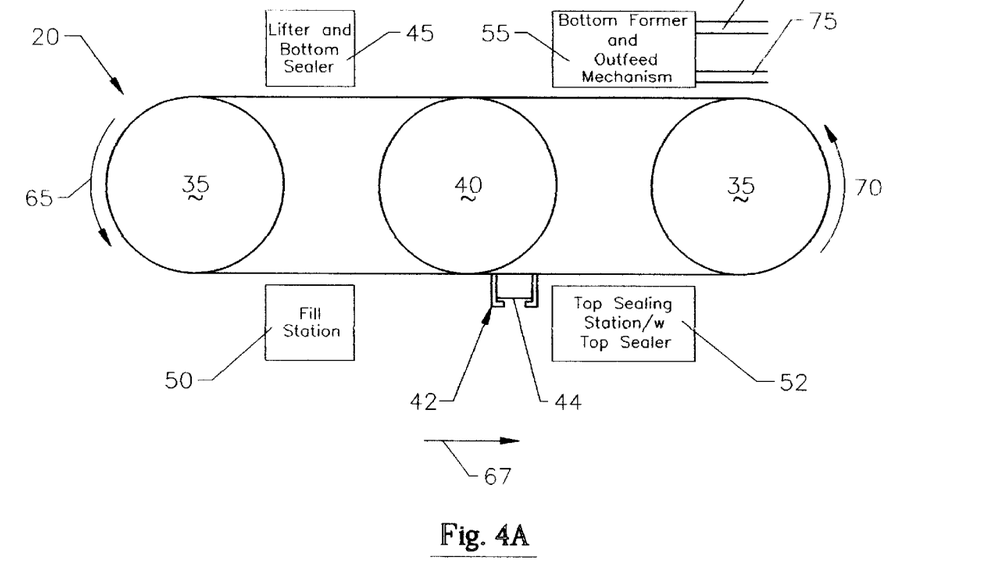
Figure 4B:
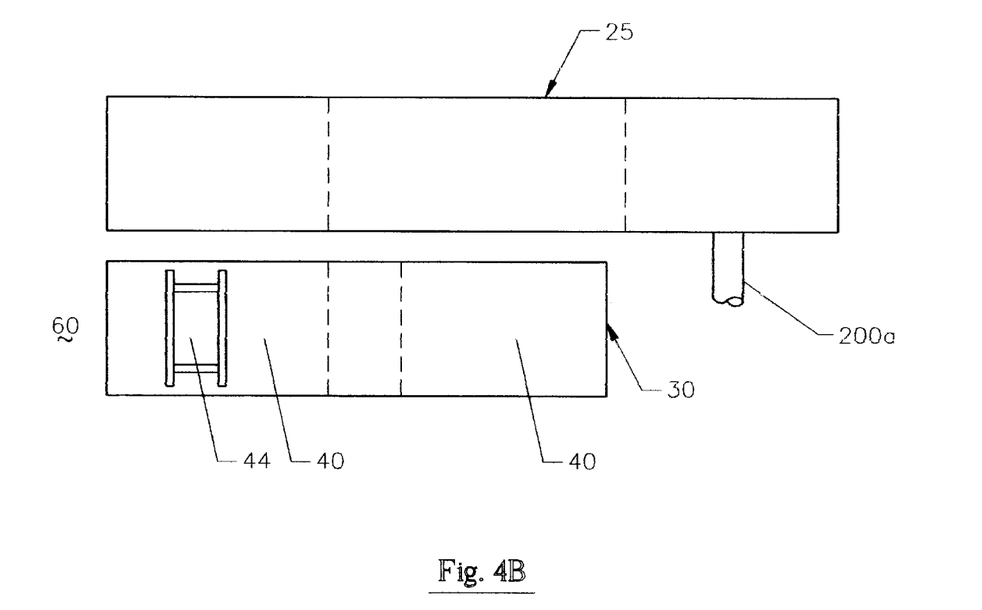

FIGS. 4A and 4B are schematic illustrations of one type of liquid packaging machine system that may be constructed in accordance with the teachings of the present invention. The particular machine shown and described in these figures is directed to filling and sealing gable-top containers. The packaging system, shown generally at 20, includes an upper endless belt conveyor 25 and a lower endless belt conveyor 30. The upper endless belt conveyor 25 is driven by a pair of pulley wheels 35 that, for example, are driven by one or more servomotors. The lower endless belt conveyor 30 is also driven by a pair of pulleys 40 that, for example, may be servomotor driven. Each of the conveyors 25 and 30 include a plurality of container supports 42, each supporting a respective container 44. The conveyors may be constructed in accordance with the teachings of U.S. Pat. No. 5,460,262, incorporated herein by reference.

A plurality of processing stations 45, 50, and 55 are disposed about the periphery of the endless belt conveyors 25 and 30. The processing stations 45, 50, and 55 each have their respective mechanical components driven by one or more servomotors that control the motion profile of the station components.

The lower conveyor 30 may receive erected carton blanks at end 60 and transport the carton blanks to processing station 45. Processing station 45 may include a lifter mechanism and a bottom sealer mechanism. The lifter mechanism may be constructed in accordance with the teachings of U.S. Pat. No. 5,599,268, titled "Belt Driven Linear Transport Apparatus for a Packaging Machine", and U.S. Pat. No. 5,517,801, titled "Lifter Mechanism Employing a Carton Gripper and Carton Bottom Seal Configuration for Same". The bottom sealer mechanism may be constructed in accordance with the teachings of U.S. Pat. No. 5,605,026, titled "Ultrasonic Carton Sealer". Both the lifter mechanism and the bottom sealer mechanism are driven by respective servomotors.

In operation, the lifter mechanism transports the erected cartons in groups from the lower conveyor 30 to the upper conveyor 25. At the upper conveyor 25, the bottoms of the cartons are sealed, for example, with previously noted sealing apparatus using ultrasonic energy.

The upper conveyor 25 transports the cartons in the direction indicated by arrow 65 to processing station 50. Processing station 50 may include a fill lifter mechanism and a plurality of filling nozzles respectively associated with each of the cartons, if the cartons are to be filled in batches. The fill lifter may be constructed in accordance with the teachings of the aforementioned '268 Patent and '801 Patent. At processing station 50, the fill lifter lifts the cartons to a position proximate the fill nozzles and gradually lowers the cartons as product is dispensed into them. After filling, the cartons, in an open-top condition, continue to be conveyed in the direction of arrow 67 to top sealing station 52 including a top sealer. The top sealer may be constructed in accordance with the teachings of the aforementioned '026 Patent.

After the tops of the cartons have been sealed, the upper conveyor 25 transports the cartons in an indexed manner in the direction of arrow 70 to processing station 55. Processing station 55 may include a bottom forming mechanism and an outfeed mechanism. The bottom forming mechanism, for example, may be constructed in accordance with the teachings of U.S. Pat. No. 5,551,211, titled "Vacuum Operated Bottom Former", and the outfeed mechanism may be constructed in accordance with the teachings of either U.S. Pat. No. 5,549,919, titled "Apparatus for Transferring Containers to a Moving Conveyor") or U.S. Pat. No. 5,560,471, likewise entitled "Apparatus for Transferring Containers to a Moving Conveyor". At processing station 55, the bottom forming mechanism forms the bottom of the cartons to allow them to sit properly in an erect state. After the bottoms have been formed, the outfeed mechanism transfers the cartons to a distribution system, shown here as a dual line conveyor 75.

Another liquid packaging machine type which may be modified to incorporate the present invention is set forth in U.S. Pat. No. 3,788,033, to Martensson et al, which is hereby incorporated by reference. In the '033 patent, container blanks are erected and bottom-sealed on a mandrel, after which they are dropped into individual carriers of a dual chain conveyor. The conveyor transports the containers along a linear path in an indexed manner between various processing stations. The processing stations include a fill station that is followed by a top-sealing station (either immediately or through a series of intermediate stations).

Machines of the foregoing type may include, or be modified to include, a control system that controls the motion and operation of the various machine components, including the indexed operation of the conveyor in accordance with a programmed motion profile. The control system is designed to meet the particular requirements of the machine and may include one or multiple processing units, depending on, for example, how many motion axes it must control.

Figure 5:
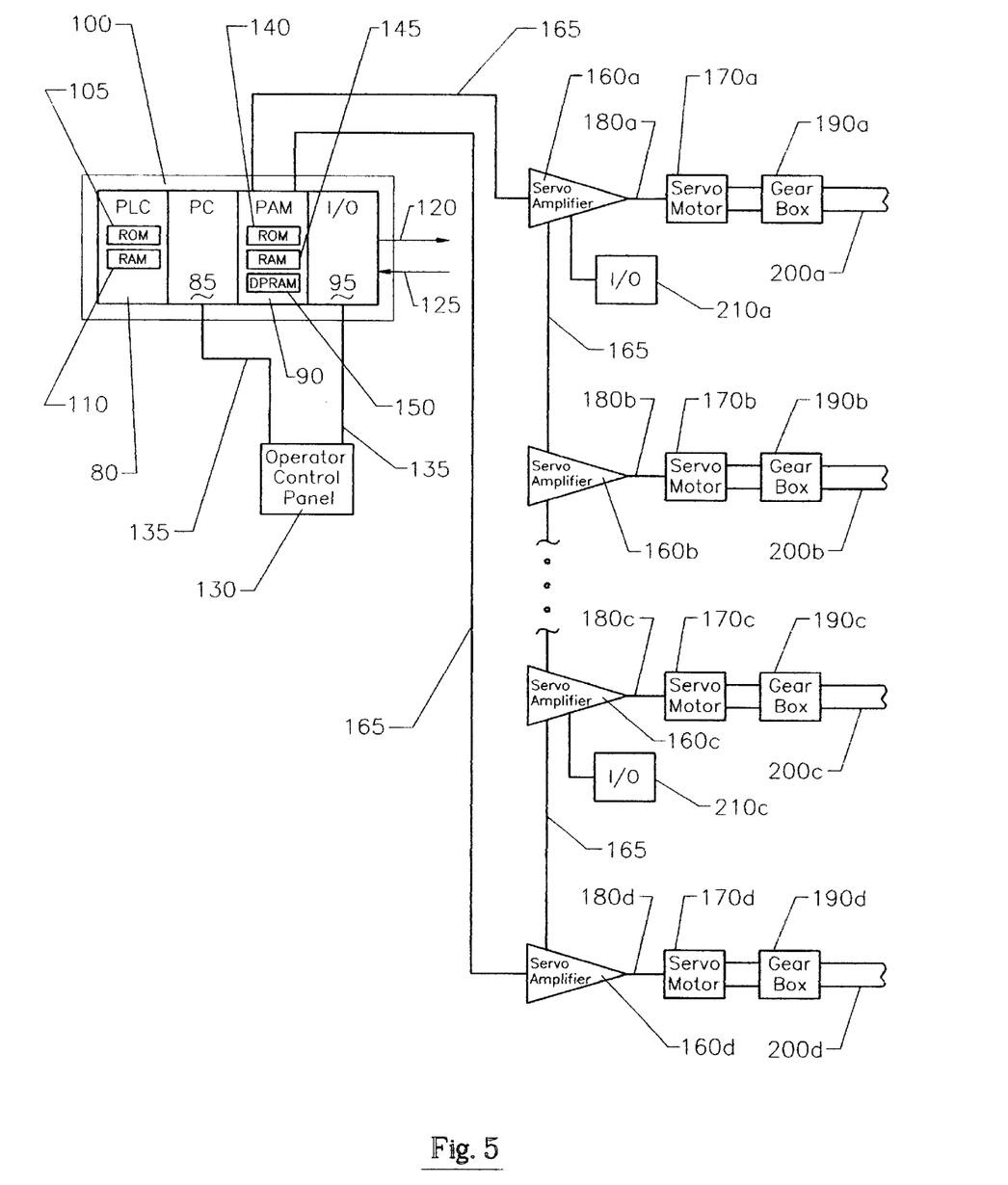

FIG. 5 is a schematic block diagram illustrating one embodiment of a control system for controlling the operation of a packaging machine having many motion axes, such as the packaging machine illustrated in FIG. 4. It will be recognized, however, that a significantly less powerful system than the one set forth in FIG. 5 may be utilized in less demanding machine systems yet still carry out the improved motion profiles set forth herein.

The control system of FIG. 5 includes a PLC 80, an industrial PC 85, a PAM 90, and an I/O interface unit 95, all of which are disposed in a bus rack 100 for communication with one another. The bus rack 100, may be a VME bus, a SIMATIC S5 bus, or any other bus that is capable of supporting multiple processors.

As illustrated, the PLC 80 includes a ROM 105 and a RAM 110. The ROM 105 includes the software that is required to program and run the PLC 80 and, for example, may include $E^2$ PROM for storing the ladder logic programming and a PLC communication program. The PLC 80 is in communication with the I/O interface unit 95 which receives and sends I/O sensor and control signals along lines 120 and 125. Additionally, the I/O interface unit 95 receives signals, such as keypresses, from an operator control panel 130 along one or more lines 135. The industrial PC 85 is also connected for communication with the operator control panel 130 which, for example, can send detailed graphic information to a display on the operator control panel 130 that advises the machine operator of the status of the machine.

The PAM 90 includes a ROM 140 and a RAM 145. The ROM 140 includes the programs necessary to operate and program the PAM 90 and, for example, may include $E^2$ PROM for storing the user program. The PAM 90 further includes a dual port memory, shown here as DPRAM 150. The PLC 80 and PAM 90 may both access the memory locations in the DPRAM 150, the PLC 80 accessing the DPRAM 15 along the VME bus. Such dual access facilitates communication between the PAM 90 and the PLC 80. One communication protocol that may be used is set forth in U.S. 08/315,414, filed Sep. 28, 1994, which is hereby incorporated by reference.

The PAM 90 is connected for communication with a plurality of servo amplifiers 160 along one or more lines 165 which may constitute an optical ring network. The servo amplifiers 160, in turn, are each connected for control of a respective servomotor 170 along lines 180. The servomotors 170, in turn, are connected to drive, for example, gear shafts 190, either directly or through a respective gear box. The drive shafts 200, for example, each constitute one or more components of one of the processing stations 45, 50, and 55.

By way of example, the servo amplifiers 160 may each be a Model ST-1 servomotor and the PAM 90 may be a programmable axes manager, both of which are manufactured and available from Socapel. Similarly, by way of example, the PLC 80 may be a Model 9070 programmable logic controller that is available from GE Fanuc.

In the case where one or more Model ST-Is are used to implement the system, the servomotors 170 may be used to sense and propagate I/O signals through, for example, I/O interface circuits 210. The status of sensor inputs as well as the control of actuating outputs to and from the I/O circuit 210 are communicated along the optical ring network.

Figure 6:
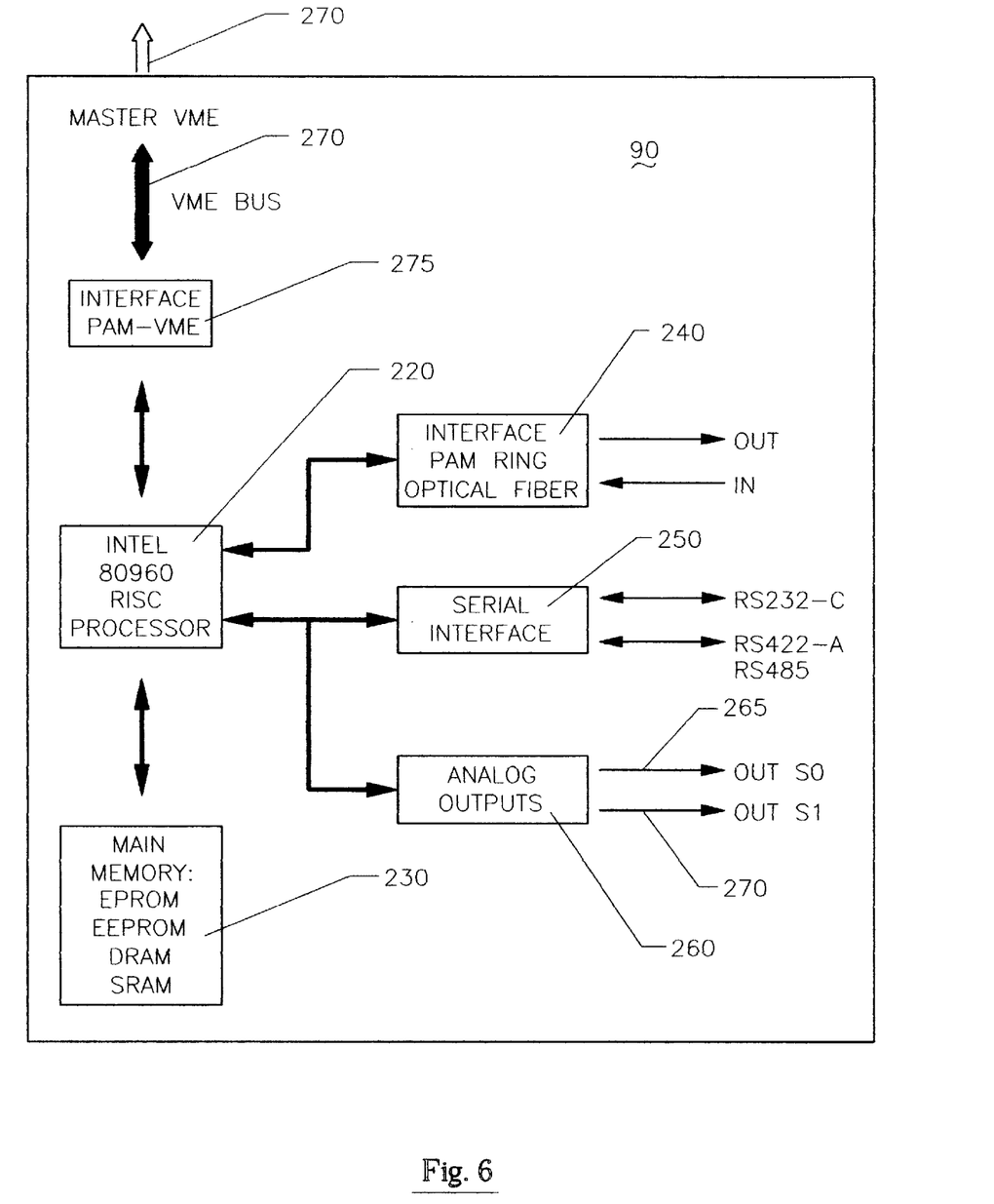

A schematic block diagram of one embodiment of a PAM 90 is set forth in FIG. 6. Central to the operation of the PAM 90, is a central processor 220 that, for example, may be an INTEL 80960 RISC processor. Programs and data for use by the central processor 220 are stored in a main memory 230. The main memory 230, as illustrated, may include EPROM, $E^2$ PROM, DRAM, and/or SRAM memory.

The central processor 230 is in communication with several different interface circuits. An optical ring interface circuit 240 is used to allow the central processor 220 to communicate with the servo amplifiers 160 over the optical ring network lines 165. A serial interface circuit 250 may be provided to allow connection between the PAM 90 and a terminal or a computer for application diagnosis and debugging. A D/A convertor circuit 260 provides analog signals at lines 265 and 270 that may be used for monitoring or debugging purposes.

Figure 7:
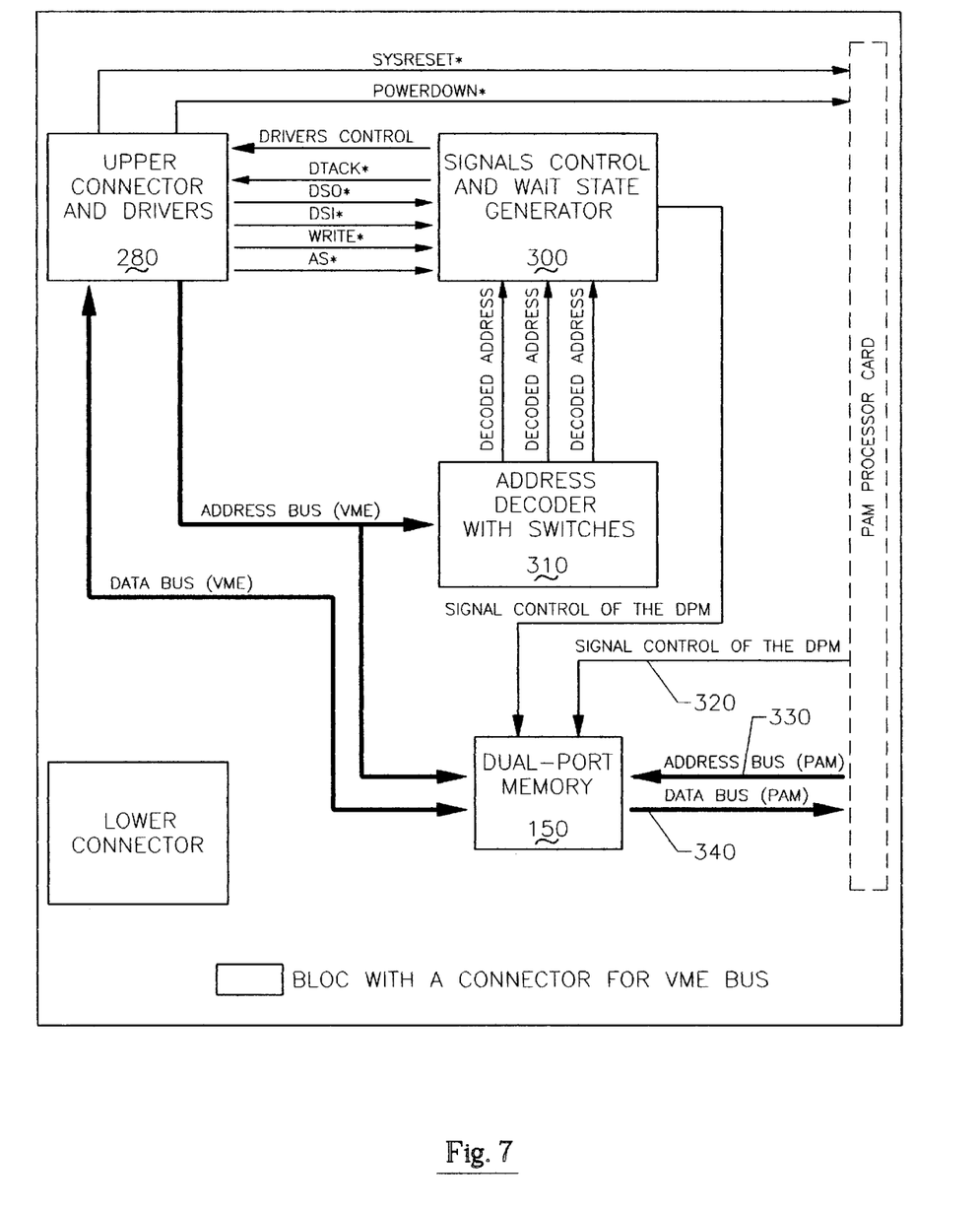

The central processor 220 connects to VME bus 270 using a PAM/VME interface circuit 275, the details of which are shown in schematic form in FIG. 7. A connector block 280 includes the connectors and drivers that are directly connected to VME bus rack 100. The interface further includes a signal control and wait state generator 300, an address decoder 310, and the dual-port memory 150.

The PAM 90 functions as a slave device on the VME bus 270. As such, the PAM 90 does not have direct access to the bus 270. Rather, all communication between the PAM 90 and the PLC 80 takes place through the dual-port memory 150 which is accessible by both the PAM 90 and the PLC 80. Access to the dual-port memory 150 over the VME bus 270 is controlled with the assistance of the signal control and wait state generator 300 and address decoder 310. Access by the central processor 220 to the dual-port memory 150 is controlled by the signals on the signal control lines 320, the address lines 330, and the data lines 340.

Figure 8:
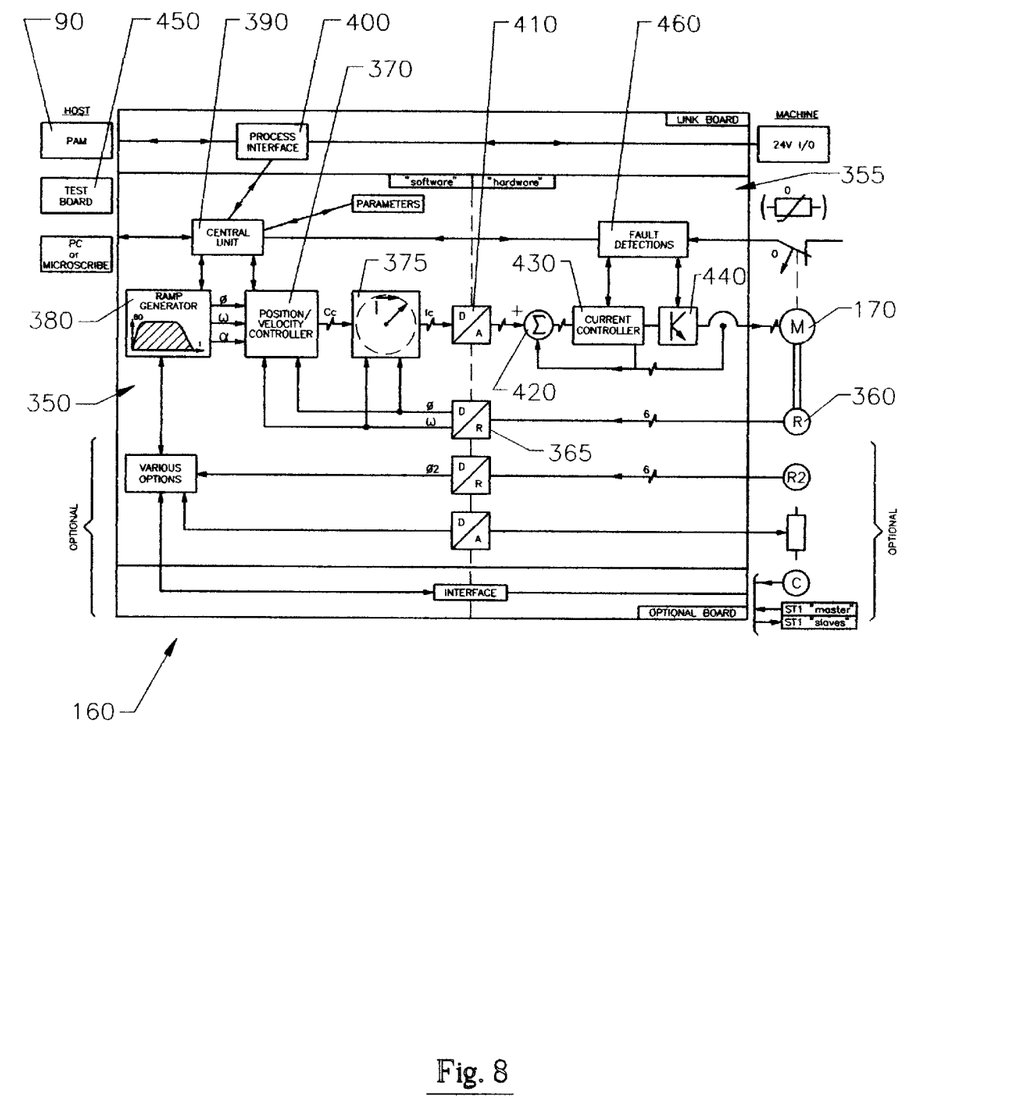

FIG. 8 is schematic block diagram of one embodiment of a servo amplifier 160 that may be used with the PAM described above. In the illustrated block diagram, the servo amplifier, has been functionally divided into software functions shown on side 350 and hardware functions shown on side 355. On the hardware side 355, the position and speed of the servomotor 160 is obtained by monitoring signals sent from a resolver 360 disposed on the shaft of the servomotor 170. These signals are supplied to a resolver hardware/software interface 365 that converts the signals into position and angular speed measurements. These measurements are sent to position/velocity controller 370 and a phase controller 375 software. The position/velocity controller 370 interfaces with ramp generating software 380 and central unit software 390. The central unit software 390 receives motion profile information from the PAM 90 through a process interface 400. The central unit software 390, in turn, sends the requisite motion profile data to the ramp generating software 380 and the position/velocity controller software 370. This data is ultimately sent as digital signals to a D/A convertor 410. The output of the D/A convertor 410 is supplied through a summing circuit 420 to a current controller 430 that, in turn, drives an inverter array 440 that supplies the necessary power signals to move the servomotor 170 to the desired position in accordance with the programmed motion profile. The central unit software 390 may also interface with a test board 450 that provides the necessary connections for a personal computer thereby allowing debugging and monitoring of the servo amplifier 160. Faults are detected by a fault detection circuit 460 and communicated to the PAM 90 through the central unit software 390 and the process interface 400. Such faults may then be communicated to the PLC 80 over the VME bus 270.

Notwithstanding the particular type of control system employed, the present inventor has developed certain programmable motion profiles for use in driving the conveyor system that exhibit significant overall improvement performances over the motion profiles that are conventionally used to drive the conveyors of packaging machines. In contrast to the jerk-limited profiles conventionally employed in the packaging machine industry, the new profiles developed by the present inventor are programmed to execute substantially infinite jerk during at least a portion thereof. It will be recognized that the machine components used to drive the conveyor in response to the control system are such that the conveyor does not exhibit a truly infinite jerk in response to the programmed motion profile. Such factors as mechanical slip, servomotor response time, etc., interject real-world factors that prevent the conveyor from exhibiting a true infinite jerk response.

In connection with both the conventional and newly developed motion profiles, it is useful to have a set of variables that may be used to describe the motion profile. In connection with the present discussion, the move portion of many of the motion profiles, P, may be described in terms of variables A, B, C, D, and E, where:

A is the percentage of acceleration time to be spent in sinusoidal acceleration, B is the percentage of acceleration time to be spent in constant acceleration, C is the percentage of acceleration time to be spent in cosinuous acceleration, D is the percentage of the move time that is to be spent in constant velocity, and E is the percent of move time by which an equal percent of the total displacement should be achieved.

The last variable, E, is called the "skew" factor. If set at 50% the profile will be symmetrical. At values less than 50% the acceleration magnitudes become larger and operate for shorter times while the deceleration magnitudes become smaller operate for longer times. At values greater than 50% the acceleration magnitudes become smaller and operate for longer times while the deceleration magnitudes become larger and operate for shorter times.

Using the foregoing variable parameters in connection with the conventional motion profiles, the Modified Sine Acceleration profile translates to P:25,0,75,0,50. In the move phase of this motion profile, 25% of the acceleration time is spent sinusoidal and 75% is spent cosinuous. As can be seen in FIG. 1, the sinusoid begins the positive acceleration of the move phase, the cosine splices to the sinusoid, completes the positive acceleration and continues through 75% of the negative acceleration, at which point another sinusoid splices to the cosine and finishes the negative acceleration. The Modified Trapezoidal Acceleration profile translates to P:25,50,25,0,50. The A, B, C, D, and E regions of the Modified Trapezoidal Acceleration profile are labeled in FIG. 2. And the pure Sinusoidal Acceleration profile of FIG. 3 could be described by either P:100,0,0,0,50 or P:50,0,50,0,50.

The substantially infinite jerk profiles that exhibit the most significant performance improvements fall into four general categories: 1) non-jerk limited constant acceleration profiles with cosinuous transitions, 2) non-jerk limited ramping acceleration profiles, 3) non-jerk limited, pure cosine profiles, and 4) non-jerk limited hybrid ramping profiles with a subtractive cosine component. A non-jerk, constant acceleration profile may also be used. Such a profile, however, has generally not performed as well as the other four non-jerk limited profiles.

Figure 9:
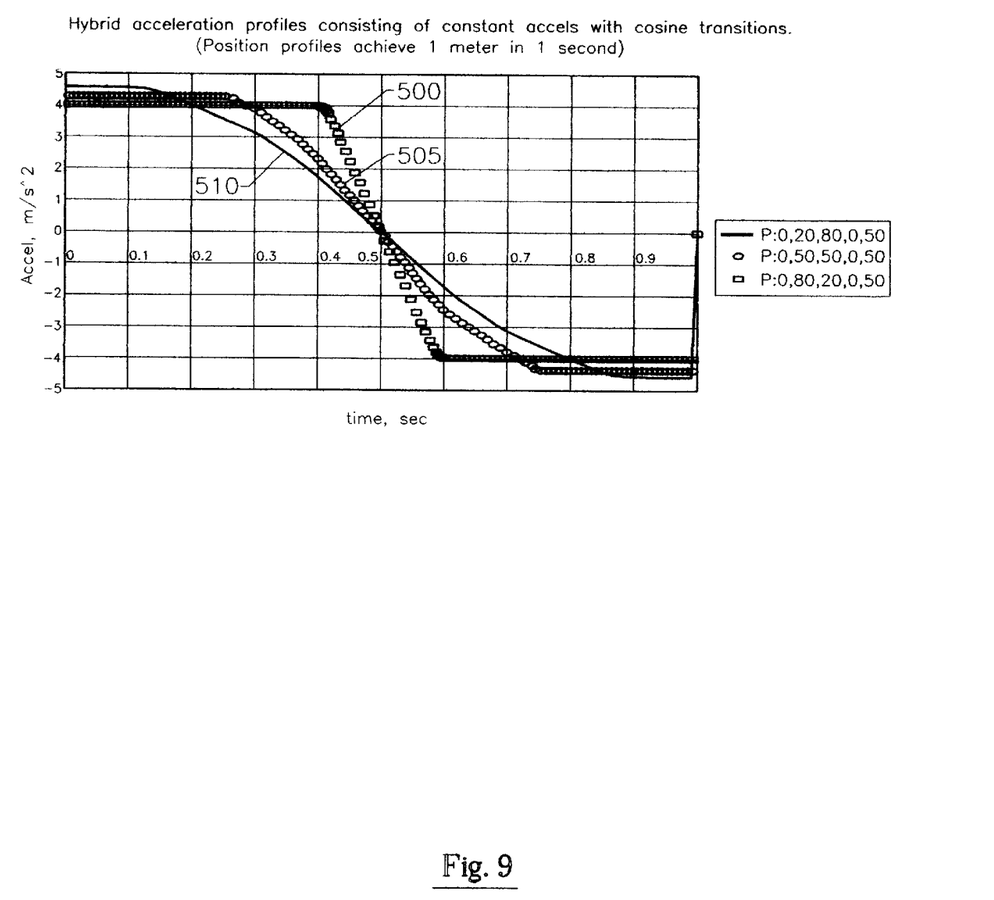
FIGS. 9–11 are graphs of exemplary embodiment of improved non-jerk limited motion profiles for use in controlling a conveyor of a liquid packaging machine.

Exemplary non-jerk limited, constant acceleration profiles with cosinuous transitions are illustrated by lines 500, 505, and 510 of FIG. 9. As illustrated, each of the motion profiles are substantially non-jerk limited at the very beginning of the move and the very end of the move with a cosinuous transition between the acceleration portion of the move and the deceleration of the move. It is the characteristic of the cosinuous transition that is often varied to ascertain the optimum motion for this motion profile. As such, this motion profile often takes on the characteristics of P:0, X, 100-X, 0, 50.

Profiles from this class typically present "quieter" liquid surfaces during dwells and allow a greater range of dwell times than corresponding constant acceleration profiles. This class of motion profiles have also generally exhibited the best performance when the distance traveled during the move is long compared to the distance from the leading panel to the back panel of the carton along the direction of movement of the conveyor. For example, a ratio of about 10:1 for the move distance/front-to-back distance has been found to be particularly advantageous for 70 mm×70 mm gable-top containers. Ratios of about 3:1 will also likely prove advantageous. Profiles around P:0,80,20,0,50 for example gave the best performance when transporting 70×70 mm cartons 720 mm.

Figure 10:
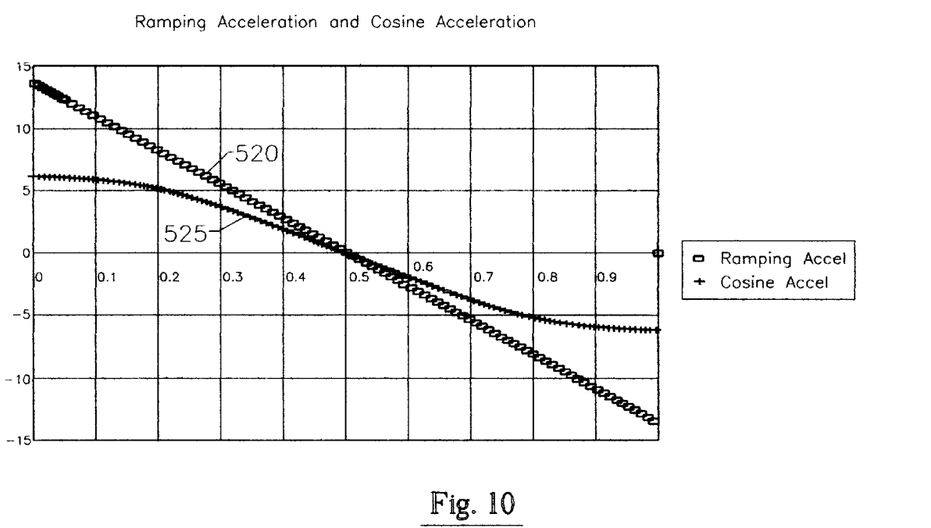

An exemplary non-jerk limited, ramping acceleration profile is illustrated by line 520 of FIG. 10. As illustrated, the motion profile is again substantially non-jerk limited at the very beginning of the move and the very end of the move with a constant slope transition between the acceleration portion of the move and the deceleration of the move. It is the characteristic of the slope that is often varied to ascertain the optimum motion for this motion profile. The non-jerk limited, ramping acceleration profile exhibits a parabolic velocity profile that can be obtained by integrating the ramping acceleration profile over the move time.

An exemplary non-jerk limited, pure cosine acceleration profile is illustrated by line 525 of FIG. 10. As illustrated, the motion profile is again substantially non-jerk limited at the very beginning of the move and the very end of the move with a constant slope transition between the acceleration portion of the move and the deceleration of the move. It is the characteristic of the amplitude of the cosine function that is often varied to ascertain the optimum motion for this motion profile.

Figure 11:
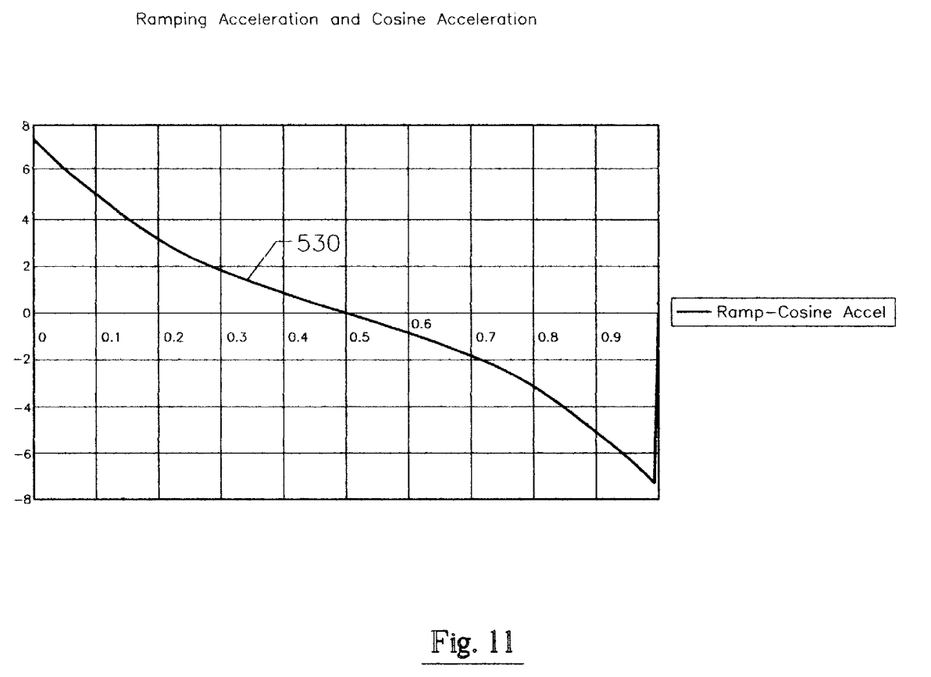

An exemplary non-jerk limited, hybrid ramping acceleration profile having a substractive cosine component is illustrated by line 530 of FIG. 11. As illustrated, the motion profile is again substantially non-jerk limited at the very beginning of the move and the very end of the move with a smooth transition between the acceleration portion of the move and the deceleration of the move. The non-jerk limited, ramping acceleration profile exhibits a parabolic velocity profile that can be obtained by integrating the ramping acceleration profile over the move time.

Use of this hybrid class is motivated by two factors: 1) the discovery that the ramping acceleration of the parabolic velocity profile frequently gives an improved performance over the conventional motion profiles, and 2) the realization that motion profiles that impart less peak energy to the liquid often perform better than motion profiles that impart more peak energy to the liquid.

To this end, the present inventor determined that he could obtain a lower peak energy profile if he could create acceleration patterns that are concave up during the acceleration portion of the move and concave down during the deceleration portion of the move. It will be recognized in view of the present teachings that there are many ways to achieve such acceleration patterns: ramping jerks, exponentials, etc. It was determined, however, to generate such a profile by subtracting cosine accelerations from ramping accelerations of the parabolic velocity profile. Testing has shown that such hybrids do, in some cases, give better performance than the pure parabolic velocity profile.

This hybrid class of motion profiles may be created in many manners. One exemplary manner takes into consideration the fact that the profile exhibits a parabolic velocity profile. To this end, a spreadsheet, application specific computer program, or the like may be used to create a parabolic velocity profile that achieves a move of some distance X in time Tmax. A sinusoidal velocity profile is then created in accordance with the equation $$-k^* \sin(pi^*t/T\max)$$

where k=0 to ~90% of the max velocity of the parabolic velocity profile. The sinusoidal velocity profile is then subtracted from the foregoing parabolic velocity profile. The resulting profile is then numerically integrated to find the distance achieved by the hybrid velocity profile. The resulting hybrid velocity profile is then multiplied by a scale factor that enables the desired Xmax to be achieved in the desired Tmax. The resulting motion profile corresponds to the motion profile that is implemented by the control system that controls the conveyor. It should be noted that the resulting data may be differentiated to generate a corresponding acceleration profile.

The optimum motion profile for moving a particular container having a predetermined liquid, a predetermined distance during an index cycle having a predetermined dwell time may be determined using an experimental method that is also contemplated herein. To this end, the distance of the move and the required dwell time for an indexing cycle is determined. Additionally, a determination may be made as to how many indexing cycles must be executed with the liquid-filled open-top containers. Generally, this is the number of indexed movements that each container must undergo between the fill processing station and the top sealing processing station. It has been found by the present inventor that a motion profile that works best for one particular dwell time will not necessarily work best for a different dwell time. Once the basic parameters noted above have been ascertained, containers of the required horizontal cross-section and length (production or production-like containers) are set in a servo-driven carriage of a conveyor system in a fashion substantially the same as the containers will experience in the production conveyor. The containers are filled to the required height with the required liquid (production or production-like). The motion controller is programmed to execute a test motion profile. The parameters of the move portion of the particular motion profile are altered during subsequent test cycles to run faster while maintaining the necessary dwell time of the indexing cycle at a constant value. Optionally, the fastest achieved move time is then held constant and the dwell time is varied to determine the range of dwells that can give acceptable performance. These test cycles are performed until the shortest move time that gives acceptable slosh is apparent.

After the optimum parameters for the particular motion profile are determined, test cycles using another motion profile are executed. A range of motion profile types are tested until the practical range of possible motion profiles has been completed.

In the case of parallelepiped containers, such as gable top containers, the containers are preferably oriented during these tests so that there are two panels that are perpendicular to the direction of travel and two panels that are parallel to the direction of travel. This is done to enable coherent slosh. If panels not perpendicular to the directions of acceleration reflect slosh waves, then waves will slosh sideways, as well as forward and back. Superposition of side-to-side waves with forward-and-back waves may eventually produce unacceptably high slosh (or low transport rates). Also, if some wave paths across the liquid surface are longer than other paths, then there will be multiple slosh periods—longer periods for the longer paths, shorter periods for the shorter paths. Such multiple slosh periods may cause some sections of the liquid surface to be out of phase with other sections of the liquid surface. A chaotic liquid surface may result.

If the carton is rectangular, but not square, in cross-section then shorter move and cycle times will be obtained if the longer two panels are oriented perpendicular to the direction of travel along the conveyor and the shorter two panels are oriented parallel to the direction of travel. Given the same accelerations, shorter wave paths will produce smaller maximum slosh amplitudes. Also, the slosh period during dwell will be smaller which could increase the number of times that the slosh is in a good position for starting the next move.

A dwell time longer than specified may enable a shorter total cycle time. For example, assume that your motion profile starts with an acceleration pattern just small enough to give acceptable slosh at the trailing container panel. If the next move is started at the end of a dwell time when the slosh on the leading panel is high, then potential energy of the slosh will abet the pressure energy delivered to the liquid by the move. As a result, the slosh at the trailing panel will rise to an unacceptable level. To this end, it may be beneficial to try dwelling an extra ½ slosh period so that the slosh is high on the trailing panel and falling when the next move begins. If the extra ½ slosh period is small compared to the move time, a shorter cycle time by increasing the dwell time will have been obtained.

For small containers such as juice and milk cartons it is particularly worthwhile to perform the tests using the liquid that will be placed in the container during production. Slosh tests with water can be misleading. For example, juice has a smaller surface tension than water and will slosh higher than water. For another example, cold honey has a larger viscosity than water and can probably be moved much faster than water without causing unacceptable slosh.

The following motion profile sequence may be used in the foregoing method to ascertain the optimum motion profile (although it will be recognized that other sequences may also be employed). First, the traditional Sine, Modified Sine, Modified Trapezoid acceleration profiles are tested to establish a benchmark to which the non-jerk limited profiles may be compared. Next, the non-jerk limited motion profiles are tested.

TRADITIONAL JERK-LIMITED PROFILES

In ascertaining the optimum motion profile type and variable characteristics, it is preferable to start with the traditional Modified Sine, Modified Trapezoidal, and Sine acceleration profiles. The fastest of the traditional motion profiles establishes the benchmark to which the performances of non-jerk limited profiles are compared. This is due to the fact that it is generally not advisable to replace an indexing cambox with a more expensive servo drive if the profiles enabled by the servo drive do not improve the production rate.

CONSTANT ACCELERATION PROFILES

The Constant Acceleration profiles that are typically tested include motion profiles having the following parameters: P:0,100,0,0,50; P:0,100,0,10,50; P:0,100,0,20,50; P:0, 100,0,30,50; P:0,100,0,40,50; P:0,100,0,50,50; P:0,100,0, 60,50; P:0,100,0,70,50; P:0,100,0,80,50; P:0,100,0,90,50.

If the performance of any one of the above profiles is better than the others, motion profiles having less of a gradient between variables are tested. For example, if P:0, 100,0,20,50, exhibits the best slosh characteristic, profiles of P:0,100,0,25,50 and P:0, 100,0,15,50 that have constant velocity constraints D that fall between the profiles adjacent to P:0,100,0,20,50 are tested. If the fastest profile shows higher slosh on the trailing panel than on the leading panel, the E value—the skew constraint—may be varied to values that reduce the positive accelerations and increase the negative accelerations until the slosh levels become substantially equal.

CONSTANT AND COSINUOUS ACCELERATION HYBRIDS:

The profiles from this class are tested in the same manner as the constant acceleration profiles above. The initial motion profile values that are tested include the following: P:0,0,100,0,50 (a pure cosine); P:0,10,90,0,50; P:0,20,80,0, 50; P:0,30,70,0,50; P:0,40,60,0,50; P:0,50,50,0,50; P:0,60, 40,0,50; P:0,70,30,0,50; P:0,80,20,0,50; and P:0,90,10,0,50.

PARABOLIC VELOCITY AND SINE

Profiles RIDS:

Profiles in this class are generally not amenable to description using the foregoing P parameters. Accordingly, a different naming convention is used to differentiate the various profiles of this class that are tested. The naming convention conforms to the PV#SIN where the PV stands for the fact that it is a Parabolic Velocity profile and the #SIN stands for a sine velocity profile whose maximum velocity is #% of the maximum velocity of the parabolic velocity profile.

The parabolic velocity and sine velocity hybrids are tested in the same way as described previously for other profile classes. The following profiles are typically tested: PV0SIN (pure parabolic velocity profile); PV10SIN; PV20SIN; PV30SIN; PV40SIN; PV50SIN; PV60SIN; PV70SIN; and, PV80SIN.

As an example of the extent to which the non-jerk limited profiles can improve move,dwell transport of open-top liquid-filled containers the following data is presented.

CONTAINER—1 liter cartons of 70×70 mm^2 cross-section to be moved in 177.8 mm moves.

DWELL TIME—530 ms.

REQUIRED INDEXING CYCLES—At least 3 with acceptable slosh.

TABLE I

| PROFILE PARAMETERS | PROFILE TYPE | MOVE TIME |
| --- | --- | --- |
| P:100,0,0,0,50 | Sine Acceleration | 580 ms |
| P:25,50,25,0,50 | Modified Trapezoidal Acceleration | 560 ms |
| P:25,0,75,0,50 | Modified Sine Acceleration | 550 ms |
| P:0,50,50,0,50 | Constant Acceleration, Cosine Acceleration Hybrid | 540 ms |
| P:0,0,100,0,50 | Pure Cosine Acceleration | 500 ms |

TABLE I-continued

| PROFILE PARAMETERS | PROFILE TYPE | MOVE TIME |
| --- | --- | --- |
| PV0SIN | Pure Parabolic Velocity | 480 ms |
| P:0,100,0,50,50 | Constant Acceleration, 50% Constant Velocity | 450 ms |
| PV60SIN | Parabolic Velocity (60%) | 440 ms |

As can be ascertained from the foregoing results, the PV60SIN reduces the required move time 140 ms below the traditional sine acceleration and 110 ms below the best traditional jerk-limited motion profile.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

I claim:

1. A conveyor system for transporting a plurality of liquid-filled containers each having an open top, the conveyor system comprising:

a conveyor for supporting the plurality of liquid-filled containers;

a servomotor connected to drive the conveyor;

a programmable servomotor control system connected to control movement of the servomotor in indexed steps in accordance with a programmed motion profile, the programmed motion profile including a move portion and a dwell portion, the move portion being substantially non-jerk limited.

2. A conveyor system as claimed in claim 1 wherein the move portion of the motion profile is substantially non-jerk limited at a beginning portion thereof.

3. A conveyor system as claimed in claim 1 wherein the move portion of the motion profile is substantially non-jerk limited at an end portion thereof.

4. A conveyor system as claimed in claim 1 wherein the move portion of the motion profile is substantially non-jerk limited at a beginning portion thereof and at an end portion thereof.

5. A conveyor system as claimed in claim 1 wherein the move portion of the motion profile has a non-jerk limited constant acceleration profile having cosinuous acceleration transitions at beginning and end portions thereof.

6. A conveyor system as claimed in claim 5 wherein the non-jerk limited constant acceleration profile having cosinuous acceleration transitions at beginning and end portions thereof may be described by a motion characteristic P in terms of variables A, B, C, D, and E, where:

A is the percentage of acceleration time spent in sinusoidal acceleration,

B is the percentage of acceleration time spent in constant acceleration,

C is the percentage of acceleration time spent in cosinuous acceleration,

D is the percentage of the move time that is spent at constant velocity, and

E is the percent of move time by which an equal percent of the total displacement should be achieved, and wherein the motion characteristic is described by P:0, F, 100F, 0, G, and wherein 10<G<90.

7. A conveyor system as claimed in claim 6 wherein the container has approximately a 70 mm×70 mm square cross-section and wherein the motion characteristic is described approximately by P:0, 80, 20, 0, 50 loop.

8. A conveyor system as claimed in claim 1 wherein the move portion of the motion profile has a non-jerk limited ramping acceleration profile.

9. A conveyor system as claimed in claim 1 wherein the move portion of the motion profile has a non-jerk limited, pure cosine acceleration profile.

10. A conveyor system as claimed in claim 1 wherein the move portion of the motion profile has a non-jerk limited hybrid ramping acceleration profile with a subtractive cosine acceleration component.

11. A liquid packaging machine for filling a container with liquid and sealing the container, the liquid packaging machine comprising:
   a filling station for filling the container with liquid when the container is in an open-top state;
   a sealing station for sealing the top of the open-top, liquid-filled container sequence
   a conveyor for supporting the open-top, liquid-filled container as it is transported from the filling station to the sealing station;
   a servomotor connected to drive the conveyor;
   a programmable servomotor control system connected to control movement of the servomotor in indexed steps in accordance with a programmed motion profile as the container is transported between the filling station and the sealing station, the programmed motion profile including a move portion and a dwell portion, the move portion being substantially non-jerk limited.

12. A liquid packaging machine as claimed in claim 11 wherein the move portion of the motion profile is substantially non-jerk limited at a beginning portion thereof.

13. A liquid packaging machine as claimed in claim 11 wherein the move portion of the motion profile is substantially non-jerk limited at an end portion thereof.

14. A liquid packaging machine as claimed in claim 11 wherein the move portion of the motion profile is substantially non-jerk limited at a beginning portion thereof and at an end portion thereof.

15. A liquid packaging machine as claimed in claim 11 wherein the move portion of the motion profile has a non-jerk limited constant acceleration profile having cosinuous acceleration transitions at beginning and end portions thereof.

16. A liquid packaging machine as claimed in claim 15 wherein the non-jerk limited constant acceleration profile having cosinuous acceleration transitions at beginning and end portions thereof may be described by a motion characteristic P in terms of variables A, B, C, D, and E, where:
   A is the percentage of acceleration time spent in sinusoidal acceleration,
   B is the percentage of acceleration time spent in constant acceleration,
   C is the percentage of acceleration time spent in cosinuous acceleration,
   D is the percentage of the move time that is spent at constant velocity, and
   E is the percent of move time by which an equal percent of the total displacement should be achieved, and
wherein the motion characteristic is described by P:0, F, 100F, 0, G, and wherein 10<G<90.

17. A liquid packaging machine as claimed in claim 16 wherein the container has approximately a 70 mm×70 mm square cross-section and wherein the motion characteristic is described approximately by P:0, 80, 20, 0, 50.

18. A liquid packaging machine as claimed in claim 11 wherein the move portion of the motion profile has a non-jerk limited ramping acceleration profile.

19. A liquid packaging machine as claimed in claim 11 wherein the move portion of the motion profile has a non-jerk limited, pure cosine acceleration profile.

20. A liquid packaging machine as claimed in claim 11 wherein the move portion of the motion profile has a nonjerk limited hybrid ramping acceleration profile with a subtractive cosine acceleration component.

21. A method for selecting a motion profile for use in moving a conveyor in indexing cycles for transporting a liquid-filled container having an open top, the method comprising:
   a) selecting a dwell time, a move length XL, for the indexing cycle;
   b) selecting a number of indexing cycles over which the open top, liquid-filled container will move during production;
   c) filling a production-like container with a production-like liquid to a level that will be used in production;
   d) placing the production-like container filled with the production-like liquid on a conveyor;
   e) moving the conveyor over the move length $X_L$ in indexed cycles, the movement of the conveyor over each indexed cycle occurring in accordance with a motion profile defined by a move portion and the selected dwell time, the move portion of the motion profile being jerk limited;
   f) altering the duration of the move portion of the motion profile while observing slosh characteristics of the production-like liquid in the production-like container;
   g) repeating step f using different durations of the move portion;
   h) moving the conveyor over the move length $X_L$ in indexed cycles, the movement of the conveyor over an indexed cycle occurring in accordance with a motion profile defined by a move portion and the selected dwell time, the move portion of the motion profile being non-jerk limited;
   i) altering the duration of the move portion of the motion profile while observing slosh characteristics of the production-like liquid in the production-like container;
   j) repeating step i using different durations of the move portion;
   k) selecting a motion profile based at least in part on the observations in steps f and i.

22. A method as claimed in claim 21 wherein steps f and g are repeated using a plurality of different jerk limited motion profiles.

23. A method as claimed in claim 22 wherein the different jerk limited motion profiles are selected from the group consisting of a modified sine acceleration profile, a modified trapezoidal acceleration profile, and a ramping acceleration profile.

24. A method as claimed in claim 21 wherein steps h and i are repeated using a plurality of different non-jerk limited motion profiles.

25. A method as claimed in claim 24 wherein steps h and i are repeated using a plurality of different non-jerk limited motion profiles selected from the group consisting of a non-jerk limited constant acceleration profile having cosinuous acceleration transitions at beginning and end portions thereof, a non-jerk limited ramping acceleration profile, a non-jerk limited, pure cosine acceleration profile, and a non-jerk limited hybrid ramping acceleration profile with a subtractive cosine acceleration component.

26. A method as claimed in claim 22 wherein steps h and i are repeated using a plurality of different non-jerk limited motion profiles.

27. A method as claimed in claim 26 wherein steps h and i are repeated using a plurality of different non-jerk limited motion profiles selected from the group consisting of a non-jerk limited constant acceleration profile having cosinuous acceleration transitions at beginning and end portions thereof., a non-jerk limited ramping acceleration profile, a non-jerk limited, pure cosine acceleration profile, and a non-jerk limited hybrid ramping acceleration profile with a subtractive cosine acceleration component.

28. A method for selecting a motion profile for use in moving a conveyor in indexing cycles for transporting a liquid-filled container having an open top, the method comprising:

subjecting the liquid-filled container to at least one type of jerk limited motion profile under production-like conditions while monitoring slosh characteristics of the liquid-filled container;

subjecting the liquid-filled container to at least one type of non-jerk limited motion profile under production-like conditions while monitoring slosh characteristics of the liquid-filled container;

selecting a jerk limited or non-jerk limited production motion profile based, at least in part, on monitored slosh characteristics.

29. A method as claimed in claim 28 wherein the at least one jerk limited motion profile is selected from the group consisting of a modified sine acceleration profile, a modified trapezoidal acceleration profile, and a ramping acceleration profile.

30. A method as claimed in claim 28 wherein the at least one non-jerk limited motion profile is selected from the group consisting of a non-jerk limited constant acceleration profile having cosinuous acceleration transitions at beginning and end portions thereof, a nonjerk limited ramping acceleration profile, a nonjerk limited, pure cosine acceleration profile, and a non-jerk limited hybrid ramping acceleration profile with a subtractive cosine acceleration component.

* * * * *